Patented July 10, 1934

1,966,317

UNITED STATES PATENT OFFICE 1,966,317

CELLULOSE ORGANIC ESTER COMPOSITION CONTAINING AN ALKYL ESTER OF AN ARYL-SUBSTITUTED MALONIC ACID

Henry B. Smith, Rochester, N. Y., assignor to Eastman Kodak Company, Rochester, N. Y., a corporation of New York No Drawing. Application December 9, 1932, Serial No. 646,522

12 Claims. (Cl. 106—40)

This invention relates to compositions of matter in which cellulose organic esters, such as cellulose acetate, are combined or mixed with other substances, such as a compatible plasticizer, with or without a common solvent for both, and with or without other useful addition agents, so that the resulting product will have properties such as will make the composition highly advantageous for use in the plastic and analogous arts, such, for instance, as the manufacture of wrapping sheets or tissue, photographic film, molding compounds and molded products, artificial silk, varnishes or lacquers, coating compositions and the like.

One object of this invention is to produce compositions of matter which may be made into permanently transparent, strong and flexible sheets or films of desired thinness which are substantially waterproof, are unaffected by ordinary photographic fluids and possess the desired properties of a support for sensitive photographic coatings. Another object of my invention is to produce compositions of matter which are capable of easy and convenient manipulation in the plastic and analogous arts, such as in the manufacture of sheets, films, artificial silk filaments, varnishes, lacquers and the like, and to produce compositions which will not injure, or be injured by, the substances or surfaces with which they are associated during manufacture. Another object of my invention is to produce compositions which can be molded at elevated temperatures and high pressures to produce plastic products having the desirable properties of celluloid. Still another object of my invention is to produce compositions of matter containing cellulose acetate which have a high degree of flexibility, softness and pliability. Other objects will become apparent to those skilled in the art to which this invention pertains.

While cellulose acetate has been known for decades, it has also been known that to utilize it in the various plastic arts it is necessary to mix therewith various plasticizing or conditioning agents. Certain of these and other addition agents are also added for the purpose of reducing the inflammability of the product. Plastic inducing agents, such as the higher alcohols and their esters, are sometimes also added. Similarly, addition compounds of various kinds have been employed to increase flexibility, transparency, toughness and other properties which will enhance the value of the resulting product. Addition products for the same or similar purposes are also added to cellulose acetate to prepare it for use in the other plastic arts, such as in the manufacture of lacquers, varnishes, artificial silk filaments, molded compounds and the like. While the plasticizers or other addition agents heretofore discovered have had their utility in the art, the increasing use to which cellulose acetate has been put and the increasing number of desirable properties required of cellulose acetate for most purposes have made the discovery of new and economical plasticizers or other addition agents a matter of considerable importance to the art. This has been a problem of some difficulty, since many of the nitrocellulose solvents are not solvents for cellulose acetate, and many substances which act as plasticizers for nitrocellulose are not compatible or at least not sufficiently compatible with cellulose acetate to be used as plasticizers in cellulose acetate compositions.

I have discovered that valuable properties may be induced in and/or contributed to compositions containing organic esters of cellulose, such as cellulose acetate, by adding thereto as a plasticizing compound a lower alkyl ester of an aryl-substituted malonic acid, such as the methyl ethyl ester of ethyl phenyl malonic acid, the diethyl ester of ethyl phenyl malonic acid, the diethyl ester of monobenzyl malonic acid, or the diethyl ester of dibenzyl malonic acid. The particularly useful properties which these compounds induce in or contribute to cellulosic compositions containing them are hereinafter enumerated.

The lower alkyl esters of mono- and dibenzyl malonic acid and methods for their preparation have been described in the literature. The lower alkyl esters of ethyl phenyl malonic acid may be prepared as follows, taking the diethyl ester as an example. The reactions involved are all well-known reactions, and any organic chemist skilled in the art is familiar with the conditions for carrying them out.

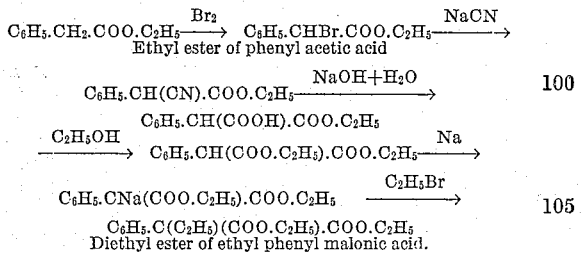

If it is desired to prepare the methyl ethyl ester of ethyl phenyl malonic acid, one starts with the methyl ester of phenyl acetic acid and proceeds in the same way. Other lower alkyl esters of phenyl alkyl malonic acids may be similarly prepared.

In order that those skilled in this art may better understand my invention I would state, by way of illustration, that for the manufacture of photographic film base or other sheets, my new compositions of matter may be compounded as follows: 100 parts of acetone-soluble cellulose acetate, i. e. cellulose acetate containing from about 36% to 42% acetyl radical, approximately, is dissolved with stirring at atmospheric temperature in 300 to 500 parts, by weight, of acetone. To this solution may be added from 10 to 50 parts by weight of the diethyl ester of ethyl phenyl malonic acid or of the diethyl ester of monobenzyl malonic acid, or of the diethyl ester of dibenzyl malonic acid, or from 10 to 30 parts by weight of the methyl ethyl ester of ethyl phenyl malonic acid. Within the limits stated, the amount of plasticizer may be decreased or increased, depending upon whether it is desired to decrease or increase, respectively, the properties which these plasticizers contribute to the finished product. The amount of solvent employed may also be increased or decreased, depending upon whether it is desired to have a more or less freely flowing composition, respectively.

A composition of matter prepared as above described may be deposited upon any suitable film-forming surface and the acetone evaporated therefrom to form a film or sheet, in a manner well-known to those skilled in the art. A film so produced has permanently brilliant transparency and low inflammability, burning no more readily than ordinary newsprint. Films or sheets produced in accordance with my invention are tough and flexible. For instance, films of cellulose acetate plasticized with from 10% to 50% (10 to 50 parts by weight based on the cellulose acetate) of the diethyl ester of ethyl phenyl malonic acid had an initial flexibility of from 35% to 300% greater than that of film containing no plasticizer, and films containing from 10% to 50% of the diethyl ester of monobenzyl malonic acid had an initial flexibility of from 35% to 365% greater than that of film containing no plasticizer. Furthermore, film so plasticized maintains flexibility in a superior fashion. For instance, at 65° C., a film of containing 30% of the methyl ethyl ester of ethyl phenyl malonic acid maintained flexibility for over 268 days, films containing from 30 to 50% of the diethyl ester of ethyl phenyl malonic acid or 20 to 30% of the diethyl ester of monobenzyl malonic acid maintained flexibility for 214 days, a film containing 50% of the diethyl ester of monobenzyl malonic acid maintained flexibility for 294 days, and a film containing 50% of the diethyl ester of dibenzyl malonic acid maintained flexibility for 272 days, whereas an unplasticized film became brittle in 30 days. This indicates that films or sheets so plasticized will withstand ordinary usage satisfactorily for many years.

Other similar solvents (instead of acetone) which are compatible with the cellulose acetate and my new plasticizers will also occur to those skilled in this art, such as ethylene chloride-alcohol mixtures. In like manner these plasticizers may be compounded with other single organic esters of cellulose, such as cellulose propionate, butyrate, stearate and the like, or with mixed organic esters, such as cellulose aceto-stearate, cellulose aceto-propionate, cellulose aceto-butyrate, cellulose aceto-lactate, cellulose aceto-tartrate or the like, a suitable solvent which will dissolve both the cellulosic derivative and the plasticizer being employed, such, for instance, as an alkylene chloride with or without the addition of alcohol.

Inasmuch as my above-described compositions of matter are useful in the production of films and sheets, it will be apparent that my new plasticizers may also be employed with advantage in the other branches of the plastic art. For instance, my novel plasticizers may be employed with advantage in connection with a number of the known lacquer and varnish formulae with which they may be found to be compatible. In such cases the plasticizer is usually first put into solution in the cellulose derivative solution, and if non-solvents are added for the purpose of cheapening the composition they are added only to such an extent as will not precipitate the derivative from solution. Other uses within the scope of my invention will also suggest themselves to those skilled in the art and are to be included within the scope of the claims appended hereto.

Certain of the alkyl esters of aryl-substituted malonic acids may also be advantageously used as plasticizers in cellulose organic ester molding compositions. For instance, when about 30% (30 parts by weight based on the cellulose acetate) of the diethyl ester of ethyl phenyl malonic acid or of the diethyl ester of monobenzyl malonic acid is homogeneously mixed with cellulose acetate, the mixture may be converted into a hard, transparent or translucent plastic product by molding at a temperature of 160–180° C. and a pressure of 2500 to 4000 pounds per square inch for a period of from 2 to 5 minutes, in a manner already known to those skilled in molding compounds of that nature.

Moreover, I have found that, upon the addition to cellulose acetate of approximately 100% of the diethyl ester of ethyl phenyl malonic acid or of the diethyl ester of monobenzyl malonic acid, quite unexpected compatibility of the plasticizer with the cellulose acetate exists and also that quite unexpected flexibility, plasticity and clarity of the final product result. Contrary to experience in most cases where such a large proportion of plasticizer is used, no exudation or crystallizing out of the plasticizer occurs. Compositions containing approximately 100% of the diethyl ester of ethyl phenyl malonic acid or of the diethyl ester of monobenzyl malonic acid have great utility where a highly flexible compound is desired, such as in the coating of a base (for instance, cloth or other fabric) in the production of artificial leather, or in the production of relatively thin sheets wherein more than the usual flexibility is important. Such a composition, if converted, for instance, into sheet form will be found to be supple and non-rigid, and to have the ability to conform readily to a surface upon which it may be placed, and this even at atmospheric temperatures.

These novel compositions of matter are produced by merely mixing the plasticizer with cellulose acetate and then adding sufficient of a common solvent, such as acetone, whereupon an intimate mixture of the plasticizer with the cellulose acetate results. The amount of acetone or other common solvent to be employed varies, of course, within rather wide limits depending upon the fluidity of the composition desired. 100 parts of acetone will suffice for some purposes, although I prefer to use 400 parts. Various high boilers or evaporation retardants, such as ethyl lactate, amyl acetate or the like may also be added if desired, as is well known in this art.

The compositions of matter so produced may then be coated into sheets in the usual way by depositing them upon plates or rolls and permitting the solvent to evaporate. If my novel compositions are to be employed in the manufacture of artificial leather, they may be coated upon, for instance, a cloth support and the solvent permitted to evaporate, or the cloth support may be caused to pass through the cellulose acetate-plasticizer composition and permitted to absorb the solution, the solvent in the coating being then permitted to evaporate. In either case, the solvent may, of course, be recovered if desired by condensing the vapors, etc.

While above and in certain of the claims appended hereto, I have referred to the use of a plasticizer in approximately equal proportions, namely in a ratio of approximately 100%, it will be understood that within this terminology variations of from 10% to 15% less than 100% of plasticizer and as much as 25% or 50% more than 100% of the plasticizer may in some instances be desirable.

What I claim as my invention and desire to be secured by Letters Patent of the United States is:

1. A composition of matter comprising a cellulose organic ester and a lower alkyl ester of an aryl-substituted malonic acid, selected from the group consisting of the diethyl ester of ethyl phenyl malonic acid, the diethyl ester of monobenzyl malonic acid, the diethyl ester of dibenzyl malonic acid, and the methyl ethyl ester of ethyl phenyl malonic acid.

2. A composition of matter comprising cellulose acetate and a lower alkyl ester of an aryl-substituted malonic acid, selected from the group consisting of the diethyl ester of ethyl phenyl malonic acid, the diethyl ester of monobenzyl malonic acid, the diethyl ester of dibenzyl malonic acid, and the methyl ethyl ester of ethyl phenyl malonic acid.

3. A composition of matter comprising cellulose acetate and the diethyl ester of ethyl phenyl malonic acid.

4. A composition of matter comprising cellulose acetate and the diethyl ester of monobenzyl malonic acid.

5. A composition of matter comprising cellulose acetate and the diethyl ester of dibenzyl malonic acid.

6. A composition of matter comprising 100 parts of cellulose acetate and about 10 to 100 parts, by weight, of the diethyl ester of ethyl phenyl malonic acid.

7. A composition of matter comprising 100 parts of cellulose acetate and about 10 to 100 parts, by weight, of the diethyl ester of monobenzyl malonic acid.

8. A composition of matter comprising 100 parts of cellulose acetate and about 10 to 50 parts, by weight, of the diethyl ester of dibenzyl malonic acid.

9. A transparent, flexible sheet comprising 100 parts of a cellulose organic ester and about 10 to 30 parts, by weight, of a lower alkyl ester of an aryl-substituted malonic acid, selected from the group consisting of the diethyl ester of ethyl phenyl malonic acid, the diethyl ester of monobenzyl malonic acid, the diethyl ester of dibenzyl malonic acid, and the methyl ethyl ester of ethyl phenyl malonic acid.

10. A transparent, flexible sheet comprising 100 parts of cellulose acetate and about 10 to 30 parts, by weight, of a lower alkyl ester of an aryl-substituted malonic acid, selected from the group consisting of the diethyl ester of ethyl phenyl malonic acid, the diethyl ester of monobenzyl malonic acid, the diethyl ester of dibenzyl malonic acid, and the methyl ethyl ester of ethyl phenyl malonic acid.

11. A molding composition adapted for molding under elevated temperatures and high pressures, comprising a cellulose organic ester and a lower alkyl ester of an aryl-substituted malonic acid, selected from the group consisting of the diethyl ester of ethyl phenyl malonic acid, the diethyl ester of monobenzyl malonic acid, the diethyl ester of dibenzyl malonic acid, and the methyl ethyl ester of ethyl phenyl malonic acid.

12. A molding composition adapted for molding under elevated temperatures and high pressures, comprising cellulose acetate and a lower alkyl ester of an aryl-substituted malonic acid, selected from the group consisting of the diethyl ester of ethyl phenyl malonic acid, the diethyl ester of monobenzyl malonic acid, the diethyl ester of dibenzyl malonic acid, and the methyl ethyl ester of ethyl phenyl malonic acid.

HENRY B. SMITH.